United States Patent Office 3,481,934
Patented Dec. 2, 1969

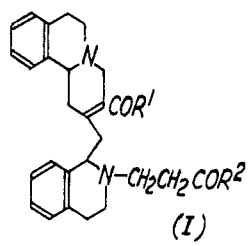
(I)
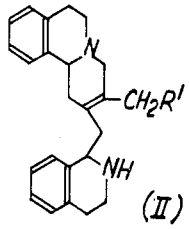
(II)
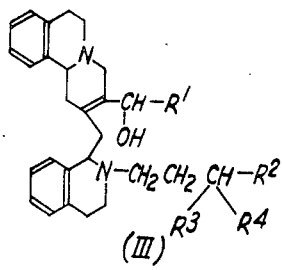
(III)
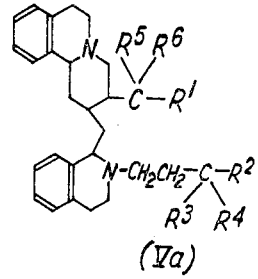
(Va)
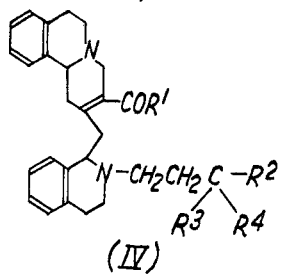
(IV)
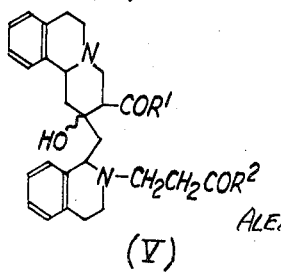
(V)
Inventors
ALEXANDER CRAWFORD RITCHIE
JOHN DEREK COCKER
GODFREY BASIL WEBB
BY Bacon & Thomas Attorneys

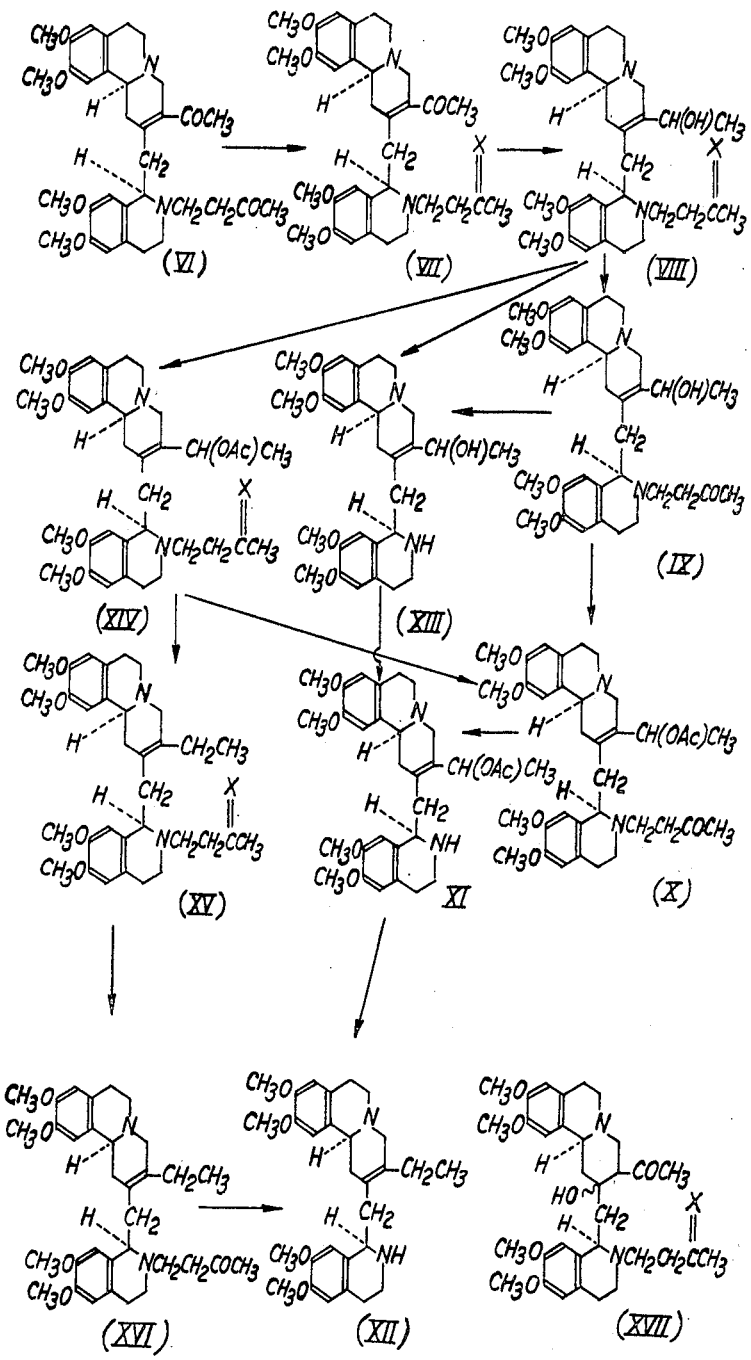

3,481,934
INTERMEDIATES FOR USE IN THE SYNTHESIS OF 2-DEHYDROEMETINE AND THEIR METHOD OF PREPARATION
Alexander Crawford Ritchie, Ware, John Derek Cocker, Chalfont St. Peter, and Godfrey Basil Webb, Greenford, England, assignors to Glaxo Laboratories Limited, Greenford, Middlesex, England, a British company
Continuation-in-part of application Ser. No. 317,939, Oct. 20, 1963. This application Aug. 2, 1966, Ser. No. 569,592
Claims priority, application Great Britain, Oct. 31, 1962, 41,264
Int. Cl. C07d 35/10, 57/02; A61k 27/00
U.S. Cl. 260—287                               12 Claims

ABSTRACT OF THE DISCLOSURE

More specifically the invention is directed to the discovery that the overall reaction leading to 2-dehydroemetine can be effected more conveniently and generally in greater yield if the carbonyl group of the gamma-oxoalkyl chain in the 2'-position is protected selectively before reduction of the 3-acyl group to a hydroxy-alkyl group.

The present invention relates to novel intermediates of use in the synthesis of 2-dehydroemetine and related compounds.

This application is a continuation-in-part application of application Ser. No. 317,939, filed Oct. 20, 1963, now abandoned.

Copending application Ser. No. 218,137, filed Aug. 20, 1962, now issued on Dec. 1, 1964 as Patent No. 3,159,638 describes a process for converting, inter alia, compounds of the skeletal Formula I shown in the accompanying drawings into 2-dehydroemetine or related compounds of the skeletal Formula II shown in the accompanying drawings (where $R^1$ and $R^2$ are aliphatic or araliphatic hydrocarbon groups) by a four stage process in which the two keto groups are simultaneously reduced to secondary hydroxy groups, these hydroxy groups acylated, the resultant ester grouping in the side chain at the 3-position reduced with a metal/ammonia or a metal/amine reducing system and the N-$\gamma$-hydroxy-alkyl substituent in the 2'-position removed, for example, by Oppenauer oxidation. 2-dehydroemetine is an especially useful antiamoebic compound having the advantage over the natural substance l-emetine of giving rise to less objectionable side effects.

We have now found that the overall reaction leading to 2-dehydroemetine can be effected more conveniently and generally in greater yield if the carbonyl group of the $\gamma$-oxo-alkyl chain in the 2'-position is protected selectively before reduction of the 3-acyl group to a hydroxy-alkyl group, thereby enabling the final oxidation stage used in the above-described process to be avoided. We have found that the carbonyl group of the 2'-$\gamma$-oxo-alkyl chain may be selectively reacted with carbonyl protecting reagents (i.e., substances able to react reversibly with a carbonyl group) such as hydrazine, aryl or acyl hydrazines, semicarbazides, Girard reagents, sulphonyl hydrazines, hydroxylamines, orthoformates, glycols, dithiols, mercapto alcohols, hydrogen cyanide etc. without substantial reaction at the carbonyl group of the 3-acyl substituent. This selective reaction does not appear to depend upon the presence of a double bond in the 2,3-position in conjugation with the unreactive carbonyl group since the same phenomenon is observed in the tertiary alcohols corresponding to the 2,3-dehydro-compound of Formula I, namely having a hydroxyl group and a hydrogen atom in the 2- and 3-positions respectively. Such tertiary alcohols are intermediates in the preparation of compounds of Formula I by the process described in copending application Ser. No. 40,200, filed July 1, 1960, now issued on Feb. 18, 1964 as Patent No. 3,131,720 and the selective protection of one carbonyl group may thus be usefully effected on the tertiary alcohol, which may then be dehydrated prior to reduction.

According to the present invention, therefore, we provide a process for the production of compounds of the skeletal Formula III shown in the accompanying drawings (where $R^1$ and $R^2$ are aliphatic, aromatic or araliphatic hydrocarbon groups and $R^3$ and $R^4$ are carbonyl-protecting groups or together constitute a single divalent carbonyl protecting group) in which a compound of the skeletal Formula IV shown in the accompanying drawings (where $R^1$, $R^2$, $R^3$ and $R^4$ have the above meanings) is reacted with a reducing agent serving to reduce a carbonyl group to a secondary alcohol group.

The reducing agent is preferably a complex metal hydride reducing agent, advantageously a borohydride or aluminium hydride of an alkali metal or alkaline earth metal. Long chain quarternary ammonium borohydrides may also be used (Sullivan and Hinckley, J. Org. Chem., 1962, 27, 3731) for example cetyltrimethylammonium or trioctylmethyl ammonium borohydride. A solvent is preferably present, and may be selected having regard to the solubility characteristics of the compound to be reduced. Thus, for example, the monosemicarbazones are water-soluble at slightly acidic pH and hence are conveniently reduced in slightly acidified water as solvent. Sodium and potassium borohydride may be used in aqueous media, either in water alone or aqueous alcohols or ethers, e.g., methanol, ethanol, dioxan, tetrahydrofuran, etc., or in anhydrous alcohols such as methanol, ethanol, etc. optionally in the presence of a hydrocarbon solvent such as benzene, toluene, etc. Where lithium borohydride or lithium aluminium hydride are used the solvent is preferably an ether such as tetrahydrofuran or diethyl ether. The long chain quaternary ammonium borohydrides have the advantage of being soluble in less polar organic solvents such as benzene, toluene, etc.

The groups $R^1$ and $R^2$ are preferably alkyl groups, advantageously having 1–5 carbon atoms. If $R^1$ is a methyl group, the resulting acetyl group at the 3-position may then be reduced to an ethyl group such as is present in 2-dehydroemetine itself. $R^2$ advantageously has 1–3 carbon atoms and is preferably a methyl group.

The substituents $R^3$ and $R^4$ form, together with the carbon atom to which they are attached, a protected carbonyl group. Protected carbonyl groups include, for example, hydrazone and substituted hydrazone groups, e.g., aryl hydrazone groups such as phenyl hydrazone groups, acylhydrazone groups such as those present in Girard reagent condensation products (derived for example from Girard Reagents T or P), semicarbazone groups or sulphonyl hydrazone groups, oxime and alkoxime groups, and ketal, thioketal and hemithioketal groups. Of these, the semicarbazone group is especially useful due to the selectivity with which it may be formed at the required position without undue reaction at the carbonyl group in the 3-acyl side chain and its resistance to the subsequent reaction steps.

The most preferred protecting groups are, however, cyclic ketal groups since these behave especially favourably in the subsequent reaction steps. The preferred glycols from which the cyclic ketals are derived are those having hydroxyl groups on adjacent carbon atoms (1,2-glycols) or those in which these groups are separated by three carbon atoms (1,3-glycols) and they advantageously contain 2–6 carbon atoms in all. Especially useful glycols include butane-2,3-diol, butane-1,3-diol and propane-1,2-diol.

The compounds of skeletal Formulae III and IV are new compounds, and, as useful intermediates in the synthesis of 2-dehydroemetine and related compounds constitute, together with their acid addition salts, a further feature of the invention.

According to a still further feature of the invention we provide a process for the preparation of a compound of skeletal Formula III in which a compound of skeletal Formula I is reacted with a carbonyl-protecting agent to form a compound of skeletal Formula IV which is then reacted with a reagent serving to reduce a carbonyl group to a secondary alcohol group, $R^1$, $R^2$, $R^3$ and $R^4$ in the above formula having the meanings given above.

According to a still further feature of the invention we provide a process for the preparation of a compound of skeletal Formula III in which a cyclic alcohol of skeletal Formula V shown in the accompanying drawings is reacted with a carbonyl-protecting agent to protect selectively the carbonyl group in the 2'-position side chain, the resulting product being reacted with a dehydrating agent to form a compound of skeletal Formula IV which is then reacted with a reagent serving to reduce a carbonyl group to a secondary alcohol group, $R^1$, $R^2$, $R^3$ and $R^4$ having the meanings given above.

Semicarbazones of general Formula IV may be prepared, in general, by reacting the corresponding compound of Formula I with semicarbazide. It is preferred to use 1 to 3 equivalents of semicarbazide and it has been observed that if the reaction is effected in aqueous solution, e.g., at about pH, 4, the required mono-semicarbazone may separate out directly. Even if the reaction mixture contains a solvent for the semicarbazone, e.g., ethanol, the reaction to form a di-semicarbazone is very slow and the course of the reaction can readily be followed, e.g., by thin layer chromatography, and stopped at the appropriate time.

Hydrazones of Formula IV may be formed by reacting the corresponding compound of Formula I with hydrazine under mildly basic conditions preferably in an inert solvent such as an alcohol or ether solvent or a mixture of such solvents. It is preferred to insure that basic conditions are maintained by adding a basic substance, preferably a substance soluble in the inert solvent used, for example a tertiary amine.

The hydrazine is advantageously reacted in excess. The cyclic alcohols also give the required monohydrazone with excess hydrazine at room temperature but at higher temperatures tend to give the di-hydrazone.

In order to form thioketals of Formula IV, the compound of Formula I or the corresponding cyclic alcohol may be reacted with a thiol, advantageously in an acid medium, for example, an alkanol such as methanol containing dissolved mineral acid, e.g., hydrochloric acid, etc., and the resulting product dehydrated. Benzyl mercaptan is outstandingly selective in forming a mono-(dibenzyl-thioketal) with the cyclic alcohols, although somewhat less selective with the 2,3-dehydro compounds of Formula I. Where a mixture of mono- and di-thioketal and unchanged starting material is obtained, however, it is possible to separate out the required mono-thioketal e.g., by chromatography, preferably after reduction of the 12-oxo group.

The cyclic ketals of Formula IV may be prepared by reacting the appropriate glycol with the compound of Formula I or the corresponding cyclic alcohol advantageously in the presence of excess acid, e.g., toluene sulphonic acid, in the presence of a solvent (e.g., benzene or an excess of the glycol) and the resulting product dehydrated. Ethylene glycol, propane-1,2-diol and butane-2,3-diol have proved to be particularly suitable glycols for the present purpose.

The noncyclic ketals of Formula IV may also be prepared by reaction of compounds of Formula I with alkyl orthoformates, preferably under acid conditions, for example in the presence of an organic strong acid such as p-toluene sulphonic acid. The reaction may be effected in a solvent such as an alcohol, advantageously containing a halogenated hydrocarbon solvent such as chloroform. A mixture of ethanol and chloroform is a preferred solvent system. Preferably the alcohol used should correspond to the alkyl group of the orthoformate. The reaction is preferably carried out at reduced temperatures and good results have been obtained, for example, at −20° C.

Where the cyclic alcohols have been selectively reacted to protect the required carbonyl group these will be dehydrated to give the desired protected compound of Formula IV preferably under basic conditions. An acid halide dehydrating agent such as thionyl chloride, phosphorus oxychloride, etc., or perferably, methane sulphonyl chloride, in a tertiary organic base such as pyridine, N-methyl morpholine, dimethylaniline, triethylamine, etc., may, for example, be used for the dehydration. The presence of the carbonyl group attached at the 3-position directs the dehydration to give the required 2,3-unsaturation.

The secondary alcohols of Formula III may then be reacted further to produce 2-dehydroemetine and related compounds. In the preferred procedure, the —CH(OH)— group attached at the 3-position is reduced, after acylation, with a metal/ammonia or metal/amine reducing system and the side chain at the 2'-position is then removed for example, by treatment to remove the protecting group or groups, e.g., by means conventional for the type of protecting group concerned. This is followed by removal of the resulting keto-alkyl side chain, for example, by reaction with hydrazine under acid conditions, e.g., in aqueous acid such as acetic or hydrochloric acid at about pH 4. In the case of ketal protecting groups, hydrazine dihydrochloride at low pH, e.g., about pH 1.0 will effect complete removal of the 2'-side chain and in the case of the semicarbazone, the side chain may be removed by treatment with hydrazine at pH 4.

It is, however, possible to remove the 2'-side chain before the metal/ammonia or metal/amine reduction and, indeed, either before or after acylation of the secondary alcohol grouping attached at the 3-position. If the side chain is removed prior to acylation, it is preferable to acylate under strongly acid conditions, e.g., in perchloric acid, since this inhibits attack at the 2'-nitrogen atom to form a bis-acyl derivative.

If the protected 2'-γ-oxoalkyl side chain is removed before metallic reduction, the presence of an >NH group may cause some demethylation of any methoxy groups which are present in the benzenoid rings. Remethylation can be effected however, for example, using a phenyltrimethylammonium salt, or diazomethane in the presence of methanol as methylating agent.

The metal-ammonia reducing system may comprise, for example, an alkali metal or alkaline earth metal, preferably lithium or calcium and liquid ammonia. An inert solvent is usefully present as a vehicle for introducing the material to be reduced for example an ether sucn as tetrahydrofuran, dimethoxyethane, diethyl ether, anisole, etc., or an aromatic hydrocarbon solvent such as benzene, toluene, etc. In the metal/primary amine system, the amine is conveniently a lower alkyl amine such as ethylamine or a diamine such as ethylene diamine. It is sometimes advantageous to include a compound liberating protons in the ammonia or amine medium, e.g., ammonium chloride or an alcohol. Care should be taken when using vigorous reduction conditions, e.g., when a proton source is present or an amine is used, that the aromatic rings are not attacked.

The acylation of the secondary alcohols of Formula III, or the corresponding compounds having an unprotected γ-ketoalkyl side chain at the 2'-position, may be effected by reaction with acylating agents, such as the appropriate acid anhydrides, preferably in the presence of acid, e.g., perchloric, sulphuric, or p-toluene sulphonic acid, or a base such as an alkali metal carbonate or acetate or pyridine. Acid halides and other acylating agents can also advantageously be used. Since the acetoxy derivatives are especially preferred, the reagent of choice is acetic anhydride.

The acyloxy intermediates and their reduction products, where they carry a ketone-protecting group, are new compounds and constitute a still further feature of the invention.

The compounds of skeletal Formulae I to IV may be substituted in the 3', 4', 5', 6', 7', 8', 6, 7, 8, 9, 10, and 11 positions by such groups as aliphatic, aromatic or araliphatic hydrocarbon, ether or thioether groups or tertiary amino groups, preferably groups having 1-5 carbon atoms, e.g., methyl, ethyl, propyl, butyl, amyl, benzyl, phenyl, methoxy, ethoxy, propoxy, butoxy, amyloxy, benzyloxy, phenoxy, dialkylamino groups, etc. Groups may also occupy more than one position as in methylene dioxy groups. According to a feature of the invention the 6', 7', 9 and 10 positions preferably carry methoxy groups, the remaining positions being unsubstituted.

It should be noted that the reduction of the keto group in the compounds of Formula IV introduces a further asymmetric centre and hence gives rise to possible stereoisomers. However, in the subsequent reactions according to the invention, this asymmetric centre is removed and it may be preferable, therefore, to use the mixture of isomers without separation.

The compounds of the skeletal formulae shown herein possess asymmetric centres at the 11b- and 1'-positions, thus leading to a number of stereoisomeric forms. The relative configuration of the hydrogen atoms at the 11b- and 1'-positions of natural emetine and of 2-dehydroemetine is that in the reaction sequence shown below for the production of 2-dehydroemetine namely with the 11b- and 1'-hydrogen atoms in the α-configuration in the various formulae herein and this stereoisomeric form is therefore preferred.

For the better understanding of the invention the following examples are given by way of illustration only. The reactions illustrated in the examples are shown diagrammatically in the reaction scheme shown in the accompanying drawings which also serves to identify the compounds used in the examples.

Example 1.—Conversion of 3-acetyl-1,4,6,7-tetrahydro-9,10 - dimethoxy - 2 - [1',2',3',4' - tetrahydro - 6',7'-dimethoxy - 2' - (3" - oxobutyl) - isoquinol - 1' - yl]-methyl - 11b[H] - benzo - [a] - quinolizine (VI) into its monosemicarbazone (VII; X=N.NHCONH$_2$)

The diketone (VI) (1.13 g., 2 mmole) was suspended in water (15 ml.) and electrometrically adjusted to pH 4 with acetic acid. The resultant solution was cooled to 5° and treated with semicarbazide (0.15 g., 2 mmole). After 1.25 hr. the reaction mixture was poured into water (50 ml.), adjusted to pH 8.5 with sodium carbonate and the precipitated solid taken into benzene. After drying over sodium sulphate, removal of the benzene gave the monosemicarbazone as a froth (1.2 g.), which could be crystallised from isopropyl ether/ethyl acetate or ethanol, $\lambda_{max.}^{EtOH/H^+}$ 230 m$\mu$ ($E_{1\,cm.}^{1\%}$ 502) and $\lambda$ max. 284 m$\mu$ ($E_{1\,cm.}^{1\%}$ 127).

(Found: C, 63.8; H, 7.4; N, 10.8. C$_{34}$H$_{45}$N$_5$O$_6$.H$_2$O requires C, 64.0; H, 7.4; N, 11.0%). Electrometric titration gave M.W. 629; required for the monohydrate: 637.

Example 2.—Reduction of the mono-semicarbazone (VII; X=N.NHCONH$_2$) to 2'-oxobutyl-12-hydroxy-2-dehydroemetine semicarbazone (VIII; X=N.NHCONH$_2$)

The mono-semicarbazone (0.62 g., 1 mmole) was dissolved in dioxan (10 ml.) and water (2 ml.) and treated with sodium borohydride (0.075 g., 2 mmole). After being kept 1 hr. at room temperature the reaction mixture was poured into excess water. The resultant solution was adjusted to pH 4 with acetic acid, and then to pH 9.0 with sodium carbonate solution and extracted with chloroform. After drying over sodium sulphate removal of the chloroform gave the mixed epimeric alcohols as a froth (0.60 g.)

$\lambda_{max.}^{EtOH/H^+}$ 230 m$\mu$ ($E_{1\,cm.}^{1\%}$ 330)

and $\lambda$ max. 282-285 m$\mu$ ($E_{1\,cm.}^{1\%}$ 101).

(Found: C, 64.0; H, 7.6; N, 10.1. C$_{34}$H$_{47}$N$_5$O$_6$.H$_2$O requires C, 63.8; H, 7.7; N, 10.95%).

Example 30.—Conversion of 2' - oxobutyl - 12 - hydroxy - 2 - dehydroemetine semicarbazone (VIII; X=:N.NHCONH$_2$) into 2'-oxobutyl-12 - hydroxy - 2-dehydroemetine (IX)

The mixture of epimeric alcohols (12.32 g.), prepared as in Example 2, was dissolved in N-sulphuric acid (150 ml.). After being kept for 3 hrs. at room temperature the reaction mixture was poured into excess sodium bicarbonate solution and the product isolated with chloroform (3×100 ml.). After washing with water and drying over sodium sulphate removal of the chloroform gave a froth (11 g.). The crude froth was treated with a mixture of ethyl acetate (50 ml.) and ether (100 ml.) and filtered from some insoluble material (0.23 g.). Removal of the solvent gave the mixed epimers (8.98 g.). Crystallisation from ethyl acetate followed by acetonitrile gave 2'-oxobutyl-12-hydroxy-2-dehydroemetine, which was shown, by thin-layer chromatography, to be a single epimer:

$\lambda_{max.}^{EtOH/H^+}$ 233.5 m$\mu$ ($E_{1\,cm.}^{1\%}$ 305)

and $\lambda$ max. 283 m$\mu$ ($E_{1\,cm.}^{1\%}$ 144).

(Found: C, 70.3; H, 7.5; N, 4.7. C$_{33}$H$_{44}$N$_2$O$_6$ requires C, 70.2; H, 7.85; N, 5.0%).

Example 4.—Conversion of 2'-oxobutyl-12-hydroxy-2-dehydroemetines (IX) into the corresponding acetates (X)

p-Toluenesulphonic acid monohydrate (0.565 g., 3 mmole) in acetic anhydride (0.92 ml., 9 mmole) and benzene (3.5 ml.) was stirred at room temperature until a clear solution resulted (35 min.). The above solution was cooled in ice/water and treated with a solution of the mixed keto-alcohols (0.56 g., 1 mmole) (prepared as described in Example 3) in benzene (1.5 ml.). After 47 min., the reaction mixture was poured into excess sodium carbonate solution and the product taken into benzene. After drying over sodium sulphate removal of the benzene gave the mixed acetates as a froth.

Example 5.—Conversion of 2'-oxobutyl - 12 - acetoxy - 2-dehydroemetines (X) into the epimeric 12-acetoxy-2-dehydroemetines (XI)

The epimeric keto-acetates (X) (3.28 g.) were dissolved in water (50 ml.) and acetic acid (18 ml.) and electrometrically adjusted to pH 4 with hydrazine hydrate (2.4 ml.). After being kept for 10 min. at 75-80°, the solution was poured into chloroform (50 ml.), covered with 2 N sodium carbonate solution (150 ml.). The aqueous layer was extracted with further chloroform (2×50 ml.), and the combined extracts were washed with water (2×50 ml.) and dried over sodium sulphate. Removal of the chloroform gave the mixed epimeric acetates as a froth (3.0 g.). Crystallisation from ethyl acetate or a mixture of methanol and chloroform gave a purer sample of 12-acetoxy-2-dehydroemetine (XI), which was shown by thin-layer chromatography to be still a mixture of the epimers. (Found: C, 66.8; H, 7.4; N, 5.45. C$_{31}$H$_{40}$N$_2$O$_6$.H$_2$O requires C, 67.1; H, 7.6; N, 5.05%).

Example 6.—Conversion of 2'-oxobutyl-12-hydroxy-2-dehydroemetine (IX) into 12-hydroxy-2-dehydroemetine (XIII)

The crystalline epimer of 2'-oxobutyl-12-hydroxy-2-dehydroemetine (1.128 g., 2 mmole) (prepared as described in Example 3) was suspended in a mixture of water (20 ml.) and hydrazine hydrate (0.2 ml., 4 mmole), and the pH adjusted to 4 with acetic acid (2.7 ml.). After being kept at room temperature overnight the reaction mixture was poured into excess sodium carbonate solution and the product isolated with chloroform (3×30 ml.). Removal of the chloroform gave a foam which, on trituration with ether, solidified to give 12-hydroxy-2-dehydroemetine (0.93 g.).

Example 7.—Direct conversion of 2' - oxobutyl - 12-hydroxy - 2 - dehydroemetine semicarbazone (VIII; $X=N.NHCONH_2$) into 12-hydroxy-2-dehydroemetine (XIII)

The mixture of epimers of the hydroxy-semicarbazone (10.4 g.), prepared as described in Example 2, was dissolved in a mixture of water (200 ml.) and acetic acid (60 ml.) and adjusted to pH 4 with hydrazine hydrate. After being kept at 95° for 30 min. the solution was poured into excess saturated sodium carbonate solution and the product isolated with methylene chloride. After removal of the methylene chloride the product was triturated with ether and the mixed epimers of 12-hydroxy-2-dehydrometine (7.6 g., 92%) filtered off and dried.

Example 8.—Conversion of 12-hydroxy-2-dehydroemetine (XIII) into 12-acetoxy-2-dehydroemetine (XI)

The mixed epimers of 12-hydroxy-2-dehydroemetine (0.796 g.), prepared as in Example 7, were dissolved in methylene chloride (7 ml.) and treated at 5° with 60% perchloric acid (0.53 ml.), followed by acetic anhydride (1.8 ml.). After being stirred for 5 min. the reaction mixture was poured into excess sodium carbonate and the product isolated with chloroform. Removal of the chloroform gave 12-acetoxy-2-dehydroemetine (0.83 g.) as a mixture of epimers, identical in chromatographic behaviour and infrared spectrum with the material prepared in Example 5.

Example 9.—Conversion of 12-acetoxy-2-dehydroemetine (XI) into 2-dehydroemetine (XII)

12-acetoxy-12-dehydroemetine (mixed epimers; 10 g., 18.7 mmole) was dissolved in a mixture of benzene (60 ml.) and tetrahydrofuran (20 ml.) and added over a period of 15 seconds to a stirred solution of lithium (0.44 g., 64 mmole) in boiling ammonia (600 ml.). Stirring was continued for 10 min. and the blue colour was then discharged with bromobenzene and the ammonia removed. The residue was treated with water (250 ml.) and extracted with methylene chloride (3× 80 ml.). After drying over sodium sulphate removal of the methylene chloride gave a froth (8.37 g.) which was dissolved in methanol (20 ml.). The solution was adjusted to pH 1 with 10 N methanolic hydrochloric acid and kept for 16 hrs. at 5°. The crystalline 2-dehydroemetine dihydrochloride was filtered off and dried (6.13 g., 56.8%).

Example 10.—Conversion of 2' - oxobutyl - 12 - hydroxy - 2 - dehydroemetine semicarbazone (VIII; $X=N.NHCONH_2$) into its acetate (XIV; $X=N.NHCONH_2$)

A solution of p-toluenesulphonic acid (0.83 g.) in acetic acid (5 ml.) and acetic anhydride (0.5 ml.) was treated with the mixed epimers of the hydroxy-semicarbazone (1.0 g.), prepared as in Example 2. After 50 min. at room temperature, the solution was dissolved in chloroform and poured into excess sodium carbonate solution. The chloroform layer was separated and the aqueous layer extracted with a further quantity of chloroform. The combined chloroform extracts were washed with water and dried over sodium sulphate. Removal of the chloroform gave the mixed epimers of the acetoxy-semicarbazone as a froth.

Example 11.—Conversion of 2' - oxobutyl - 12 - acetoxy - 2 - dehydroemetine semicarbazone (XIV; $X=N.NHCONH_2$) into 2'-oxobutyl-12-acetoxy-2-dehydroemetine (X)

The acetoxy-semicarbazone (12 g.) (mixed epimers, prepared as described in Example 10), was dissolved in N hydrochloric acid. After being kept at room temperature for 1 hr. the reaction mixture was poured into excess sodium carbonate solution and the product isolated with chloroform. Removal of the solvent gave the mixed epimers of 2'-oxobutyl-12-acetoxy-2-dehydroemetine (10 g.) as a froth. The material resembled, on thin-layer chromatography, the product of Example 4.

Example 12.—Conversion of 2' - oxobutyl - 12 - acetoxy - 2 - dehydroemetine semicarbazone (XIV; $X=:N.NHCONH_2$) into 2'-oxobutyl-2-dehydroemetine semicarbazone (XV: $X=N.NHCONH_2$)

In a flask fitted with stirrer, dropping funnel and carbon dioxide condenser, was placed ammonia (150–200 ml.) (freshly distilled from sodium). The ammonia was cooled to −45° and treated with a solution of 2'-oxobutyl-12-acetoxy-2-dehydroemetine semicarbazone (3.3 g.) (mixed epimers, prepared as described in Example 10) in tetrahydrofuran (25 ml.). The solution was allowed to reflux and treated with pieces of lithium until the solution assumed a permanent blue colour. After 1 min. the blue colour was discharged with bromobenzene (3 drops), and the ammonia allowed to evaporate. The residue was treated with benzene (250 ml.), and the benzene solution washed with water until the washings were neutral. After drying over sodium sulphate removal of the benzene gave an off-white froth (2.82 g.). Crystallisation from ethanol (12 ml.) gave 2'-oxobutyl-2-dehydroemetine semicarbazone (1.75 g., 58%).

Example 13.—Conversion of 2' - oxobutyl - 2 - dehydroemetine semicarbazone (XV; $X=:N.NHCONH_2$) into 2'-oxobutyl-2-dehydroemetine (XVI)

The semicarbazone (6.63 g.) was dissolved in N hydrochloric acid (120 ml.). After being kept for 1.5 hr. at room temperature the reaction mixture was poured into 2 N sodium carbonate solution (100 ml.), and the product taken into benzene. Removal of the benzene gave 2'-oxobutyl-2-dehydroemetine (5.23 g., 87.5%) as a froth.

Example 14.—Conversion of 2'-oxobutyl-2-dehydroemetine (XVI) into 2-dehydroemetine (XII)

2'-oxobutyl-2-dehydroemetine (5.23 g.) was dissolved in a mixture of water (150 ml.) and acetic acid (5 ml.), and treated with hydrazine hydrate (1.0 ml.). The solution was electrometrically adjusted to pH 4.0 with acetic acid (8 ml.). After being kept for 24 hrs. at room temperature the reaction mixture was poured into excess sodium carbonate solution and the product isolated with benzene (×3). Removal of the benzene gave a froth (4.56 g.) which was dissolved in methanol (10 ml.) and adjusted to pH 1 with 11 N methanolic hydrochloric acid. After being kept for 16 hrs. at 5° the crystalline 2-dehydroemetine dihydrochloride was filtered off and dried (4.72 g.).

Example 15.—Conversion of diketone (VI) into its mono-(diethyl ketal) (VII; $X=(OEt)_2$)

The diketone (1.126 g., 2 mmole) was dissolved in a mixture of chloroform (9 ml.), ethanol (11 ml.) and ethyl orthoformate (20 ml.). The solution was cooled to 5° and treated with 0.5 M p-toluenesulphonic acid in benzene (12 ml.). After 45 min. at 5° the reaction mixture was poured into excess sodium carbonate solution and the product isolated with benzene. Removal of the solvent gave the diethyl ketal (1.23 g., 96%) as a froth. The infrared spectrum showed that only the saturated ketone group had been attacked.

Example 16.—Conversion of 3-acetyl-1,2,3,4,6,7-hexahydro - 2 - hydroxy-9,10-dimethoxy-2-[1',2',3',4'-tetrahydro - 6',7' - dimethoxy-2'-(3"-oxobutyl)-isoquinol-1'-yl] - methyl - 11b[H] - benzo-[a]-quinolizine (XVII; X=:O) into its monosemicarbazone (XVII; X=N.NHCONH$_2$)

The dihydrochloride of compound (XVII; X=:O) (1.3 g., 2 mmole) was dissolved in water (23 ml.) and the solution electrometrically adjusted to pH 4 with saturated sodium carbonate solution. Semicarbazide (0.15 g., 2 mmole) was added and the solution readjusted to pH 4 with acetic acid. After being kept for 2.5 hrs. at room temperature the mixture was treated with water (50 ml.) and the solution basified with sodium carbonate solution. The precipitated solid was taken into benzene. After drying over sodium sulphate, removal of the benzene gave a froth (1.02 g.).

$\lambda_{max.}^{EtOH/H+}$ 229 m$\mu$ ($E_{1\,cm.}^{1\%}$ 386) and $\lambda$ max. 280–284 m$\mu$ ($E_{1\,cm.}^{1\%}$ 116)

The above froth was treated with ethyl acetate (7 ml.) and ether (10 ml.) and filtered from some insoluble gum. Addition of ether (10 ml.) to the filtrate gave the monosemicarbazone (0.39 g.).

$\lambda_{max.}^{EtOH/H+}$ 228.5 m$\mu$ ($E_{1\,cm.}^{1\%}$ 432) and $\lambda$ max. 280–285 m$\mu$ $E_{1\,cm.}^{1\%}$ 116)

(Found: C, 62,4; H, 7.4; N, 10.9. C$_{34}$H$_{47}$N$_5$O$_7$.H$_2$O requires 62.3; H, 7.5; N, 10.7%). Electrometric titration gave M.W. 648; required for the monohydrate: 655.7.

Example 17.—3-acetyl-1,2,3,4,6,7-hexahydro-2[1',2',3',4'-tetrahydro - 2'[3",3" - bis - (benzyl - mercapto)-n-butyl] - 6',7' - dimethoxy-isoquinol - 1'-yl]methyl-2-hydroxy - 9,10 - dimethoxy - 11b-[H]-benzo-[a]quinolizine (XVII; X=(S.CH$_2$C$_6$H$_5$)$_2$)

The base (XVII) hydrochloride (X=O)(20 g.) was suspended at room temperature in anhydrous methanolic hydrogen chloride solution (200 ml.) and benzyl mercaptan (10 ml.) added. After 2–3 hrs. at room temperature with stirring, only a faint cloudiness remained. The solution was clarified by filtration through kieselguhr and the filtrate evaporated to dryness at room temperature in vacuo. The residue was taken up in chloroform (100 ml.) and 2 N-sodium hydroxide added cautiously, with cooling, until the pH of the aqueous phase was ca. 10. The layers were separated and the aqueous portion extracted with chloroform (2× 50 ml.). The first two extracts were combined and washed with 2 N-sodium hydroxide solution followed by water (3× 250 ml.), the washings being back-extracted with the third chloroform extract. The combined organic layers were dried (MgSO$_4$) and the solvent removed by evaporation in vacuo at room temperature. The residual grum was converted by trituration with ether into a pale pink solid (15.5 g.), M.P. 171–172°.

Recrystallisation of this type of material from acetonitrile gave pure (XVII; X=(S.CH$_2$C$_6$H$_5$)$_2$) as a white crystalline solid, M.P. 173–174° (Found: C, 69.56; H, 7.31; N, 3.46; S, 8.16. C$_{47}$H$_{58}$N$_2$O$_6$S$_2$ requires C, 69.65; H, 7.21; N, 3.46; S, 7.29%).

Example 18

(i) (cf. Example 15) 2'-oxobutyl-12-hydroxy-2-dehydroemetine diethyl ketal (VIII; X=(OEt)$_2$)

The diethyl ketal (1.27 g.), prepared as in Example 15, was dissolved in ethanol (11 ml.) and treated with a solution of sodium borohydride (0.30 g.) in water. After 2 hrs. the reaction mixture was poured into excess sodium carbonate solution and the product isolated with benzene. 2' - oxobutyl - 12 - hydroxy-2-dehydroemetine diethyl ketal (1.19 g.) was obtained as a froth, which showed the expected infrared absorption.

(ii) Conversion of 2' - oxobutyl-12-hydroxy-2-dehydroemetine diethyl ketal (VIII; X=(OEt)$_2$) into 2-dehydroemetine (XII)

2' - oxobutyl - 12 - hydroxy-2-dehydroemetine diethyl ketal (0.68 g.), in benzene (10 ml.) and pyridine (3 ml.), was treated with acetic anhydride (1 ml.) for 40 hrs. at room temperature. The reaction mixture was poured into excess sodium carbonate and the acetate (XIV; X=(OEt)$_2$) was isolated with benzene as a froth (0.58 g.). This material (0.57 g.) in ether (15 ml.) was added to liquid ammonia (50 ml.) and the solution was treated with lithium chips until a permanent blue colour persisted in the solution. After 1 min. the blue colour was discharged with bromobenzene and the ammonia removed. The residue was treated with water and the product isolated with ether to give 2'-oxobutyl-2-dehydroemetine diethyl ketal (XV; X=(OEt)$_2$)(0.46 g.) as a froth. This was treated with N-hydrochloric acid (5 ml.) at 55° for 30 min. and the solution was then adjusted to pH 4 with hydrazine and heated on the steam bath for 10 min. The reaction mixture was basified with aqueous sodium carbonate and the product isolated with benzene. The resulting froth was dissolved in 1:1 methanol-ether (2 ml.) and adjusted to pH 1 with 10 N-methanolic hydrogen chloride. After being kept at 5° for 3 hrs. the crystalline 2-dehydroemetine dihydrochloride (0.2 g.) was filtered off and dried.

Example 19

(i) Conversion of diketone (VI) into its monoethylene ketal (VII; X=—OCH$_2$CH$_2$O—)

The diketone (0.56 g.), in benzene (20 ml.) and ethylene glycol (10 ml.), was treated with 0.5 M-p-toluenesulphonic acid in benzene (6 ml.) and the mixture was shaken for 1.5 hrs. Excess sodium carbonate solution was added, and the product was isolated from the organic phase. Crystallisation from ether and then from isopropyl alcohol gave the monoethylene ketal as plates, $\lambda_{max.}^{EtOH}$ 283 m$\mu$ ($\epsilon$9,750)

(Found: C, 69.3; H, 7.9; N, 4.4. C$_{34}$H$_{46}$N$_2$O$_7$ requires C, 69.3; H, 7.6; N, 4.6%).

(ii) Conversion of the monoethylene ketal (VII; X=—OCH$_2$CH$_2$O—) into the epimeric 2'-oxobutyl-12-hydroxy - 2 - dehydroemetine ethylene ketals (VII; X=—OCH$_2$CH$_2$O—)

(a) Reduction with sodium borohydride.—The monoethylene ketal (32 g.), in a mixture of benzene (300 ml.), ethanol (220 ml.) and water (36 ml.), was treated with sodium borohydride (2.8 g.) and the mixture was stirred at 20° for 2 hrs. Excess potassium carbonate was added and the product was isolated with benzene to give the mixed epimers (32 g.) as a froth. Crystallisation from ethyl acetate (50 ml.) gave one epimer (designated $\alpha$) of 2'-oxobutyl-12-hydroxy - 2 - dehydroemetine ethylene ketal (Found: C, 68.6; H, 7.7; N, 4.4. C$_{35}$N$_{48}$N$_2$O$_7$ requires C, 69.0; H, 8.0; N, 4.6%).

The mother liquors from the crystallisation were chromatographed on alumina. Ethyl acetate eluted a solid, which on crystallisation from a mixture of ethyl acetate and isopropyl ether gave the second epimer (designated $\beta$) of 2'-oxobutyl-12-hydroxy-2-dehydroemetine ethylene ketal (Found: C, 68.6; H, 7.6; N, 4.5. C$_{35}$H$_{48}$N$_2$O$_7$ requires C, 69.0; H, 7.9; N, 4.6%).

The two epimers could be distinguished by thin-layer chromatography on aluminia, with 2% methanol in ethyl acetate as developing solvent; the $\alpha$- and $\beta$-epimers had $R_F$ 0.2 and 0.47 respectively. Also, the infrared spectrum of the $\alpha$-epimer in bromoform showed a band at 3550 cm.$^{-1}$, whereas the $\beta$-epimer showed a band at 3200 cm.$^{-1}$.

(b) Reduction with lithium aluminium hydride.—The monoethylene ketal (1.2 g.) in tetrahydrofuran (10 ml.) was stirred with lithium aluminium hydride (0.11 g.) at room temperature for 20 min. The reaction mixture was poured into excess 2 N-sodium carbonate and the product isolated with benzene to give the mixed epimers of 2′-oxobutyl-12-hydroxy-2-dehydroemetine ethylene ketal (1.2 g.) as a froth, identified by thin-layer chromatography and by its infrared spectrum.

(iii) 2′ - oxobutyl-12-acetoxy-2-dehydroemetine ethylene ketal (XIV; X=—OCH$_2$CH$_2$O—)

(a) α-Epimer.—2′-oxobutyl-12-hydroxy - 2 - dehydroemetine ethylene ketal (α-epimer) (0.3 g.), in benzene (6 ml.) and pyridine (1.5 ml.), was treated with acetic anhydride (0.6 ml.) and kept at 50° for 16 hrs. Excess sodium carbonate solution was added and the product was isolated with benzene and crystallised from isopropyl alcohol to give the acetate (0.21 g.) (Found: C, 68.4; H, 7.6; N, 4.4. $C_{37}H_{50}N_2O_8$ requires C, 68.3; H, 7.7; N, 4.3%).

(b) β-Epimer.—Acetylation of the 12-hydroxy compound (β-epimer) as described in (a) and crystallisation of the product from isopropyl alcohol gave the corresponding acetate (Found: C, 68.5; H, 7.7; N, 4.3. $C_{37}H_{50}N_2O_8$ requires C, 68.3; H, 7.7; N, 4.3%).

(iv) Conversion of 2′-oxobutyl-12-acetoxy - 2 - dehydroemetine ethylene ketal (XIV; X=—OCH$_2$CH$_2$O—) into 2′-oxobutyl-2-dehydroemetine ethylene ketal (XV; X=—OCH$_2$CH$_2$O—)

(a) 2′-oxobutyl-12-acetoxy-2-dehydroemetine ethylene ketal (β-epimer) (0.97 g.) in tetrahydrofuran (10 ml.) was added to ethylamine (50 ml.). The refluxing solution was treated with lithium chips (0.057 g.) under an atmosphere of nitrogen and stirred for 2 hrs. Ammonia (50 ml.) was added and the reaction stirred a further 15 min. The colour was then discharged with a few drops of acetone, the ammonia was removed by evaporation, and water was added.

The pure material, crystallised from isopropyl ether, had $\lambda_{max.}^{EtOH}$ 282—286 m$\mu$ ($\epsilon$ 7,650)

(Found: C, 71.0; H, 8.3; N, 5.0. $C_{35}H_{48}N_2O_6$ requires C, 70.9; H, 8.2; N, 4.7%).

(b) To a solution of t-butanol (5 ml.) in ammonia (30 ml.) was added 2′ - oxobutyl-12-acetoxy-2-dehydroemetine ethylene ketal (α-epimer) (0.563 g.) in tetrahydrofuran (5 ml.). The resultant solution was treated with lithium chips until the solution assumed a permanent blue colour. After stirring for 0.5 min. the blue colour faded. Isolation as in (a) gave 2′-oxobutyl-2-dehydroemetine ethylene ketal (0.48 g.) as a white froth which was identified by its infrared, ultraviolet and N.M.R. spectra.

(v) Conversion of 2′-oxobutyl-2-dehydroemetine ethylene ketal (XV; X=—OCH$_2$CH$_2$O—) into 2-dehydroemetine (XII)

2′-oxobutyl-2-dehydroemetine ethylene ketal (2.88 g.) and hydrazine dihydrochloride (1.27 g.) in water (50 ml.) were heated for 3 hrs. on the steam bath. The reaction mixture was basified with 2 N-sodium carbonate and the product was isolated with benzene and dissolved in ethanol (9 ml.). Addition of 5 N-ethanolic hydrogen chloride to pH 1 gave crystalline 2-dehydroemetine dihydrochloride (2.2 g.).

(vi) Conversion of diketone (VI) into dehydroemetine (XII), via monoethylene ketals, but without isolation of intermediates The diketone (20 g.) was suspended in ethylene glycol (100 ml.) and added to a solution of anhydrous p-toluene sulphonic acid (17 g.) in ethylene glycol (100 ml.) at 25°. After being shaken for 15 minutes the clear solution was poured into a solution of sodium acetate (17 g.) in water (300 ml.) at 0°. A solution of sodium borohydride (2.3 g. in 50 ml. water) was added with stirring over 20 minutes, keeping the temperature at 0°. After stirring for 15 minutes the mixture was poured into benzene (150 ml.) and 2 N-sodium carbonate solution (150 ml.). The aqueous layer was extracted twice more with benzene (2× 100 ml.) and the extracts washed with water (2× 100 ml.). The benzene was dried and the volume reduced to 200 ml. by evaporation, and then acetic anhydride (8.5 ml.) and anhydrous potassium carbonate (3.5 g.) were added and the mixture heated under reflux overnight. The following day the solution was filtered and evaporated to a froth, which was dissolved in diethyl ether (180 ml.) The ethereal solution was added to liquid ammonia (800 ml.) and t-butanol (10.5 ml.) and a solution of lithium in ammonia (ca. 0.9 g. in 200 ml.) added over 1 minute until a permanent blue colour was obtained. After stirring for 30 seconds the blue colour was discharged by addition of acetone and the ammonia and solvent evaporated off. The residue was taken up in water (300 ml.) and benzene (200 ml.) and the aqueous layer extracted twice more with benzene (2× 100 ml.). Hydrazine dihydrochloride (8.5 g.). was added to the aqueous layer and the solution heated under reflux for 3 hrs. The solution was cooled and poured into 2 N-sodium carbonate solution (300 ml.) and benzene (100 ml.). The aqueous layer was extracted twice more with benzene (2× 100 ml.) and the benzene extracts washed with water (2× 75 ml.). The benzene solution was dried (sodium sulphate) and evaporated to a froth. The latter was taken up in industrial methylated spirit (60 ml.) and acidified to pH 1 with alcoholic hydrogen chloride. The dehydroemetine dihydrochloride was allowed to crystallise for 48 hrs. at 0°.

Weight=13.7 g. (66.7% theoretical yield).

The above experiment was repeated, but without t-butanol in the liquid ammonia stage, and a yield of 66.2% of theory was obtained.

Example 20

(i) Conversion of diketone (VI) into its 2,3-butyleneketal (VII X=—OCH(CH$_3$)CH(CH$_3$)O—)

(a) The diketone (1.406 g., 2.5 mmole) was dissolved in dry benzene (25 ml.) and butane-2,3-diol (12.5 ml.) and treated with a 0.5 M solution of p-toluenesulphonic acid in benzene (15 ml.). The solution was shaken at 22-25° for 2 hours, basified with 2 N sodium carbonate solution and the product isolated with benzene. After washing with water and drying over potassium carbonate removal of the solvent gave the ketal as a froth, which was dissolved in a small volume of ether. After being kept at 5° for 24 hr. the crystalline diketone 2,3-butyleneketal (0.334 g.) was obtained;

$\lambda_{inf.}^{EtOH}$ 225 m$\mu$ ($\epsilon$ 21,200) and $\lambda_{max.}^{EtOH}$ 281—286 m$\mu$ (—9,390)

(Found: C, 70.28; H, 8.1; N, 4.3. $C_{37}H_{50}N_2O_7$ requires C, 70.0; H, 7.9; N, 4.4%).

(b) Anhydrous p-toluenesulphonic acid (8.58 g., 50 mmole) was dissolved in 2,3-butanediol (30 ml., 350 mmole) and diketone VI (9.63 g., 17.1 mmole) added. After being shaken at room temperature (18°) for 1.75 hrs. benzene (50 ml.) was added and the solution poured into 2 N sodium carbonate (150 ml.). The aqueous layer was further extracted with benzene (50 ml. and 25 ml.), and the combined benzene extracts washed with 2 N sodium carbonate and water. Removal of the benzene gave diketone mono 2,3-butylene ketal (10.76 g., 99%) as a froth.

$\nu_{max.}^{carbon\ disulphide}$ 1720<5%>C=O and 1685 cm$^{-1}$>95% —CO.C=C.

(ii) Conversion of diketone (VI) into 2′-oxobutyl-12-hydroxy-2-dehydroemetine 2,3-butylene ketal (VIII; X=—OCH(CH$_3$)CH(CH$_3$)O—)

To a solution of anhydrous p-toluenesulphonic acid (17.2 g.) in butane-2,3-diol (60 ml.) was added the diketone (19.8 g.) After being shaken for 1.75 hrs. at 23° the reaction mixture was poured into a stirred solution of sodium acetate (17 g.) in water (300 ml.) at 10°. The resultant solution of the mono-2,3-butylene ketal (VII; X=—O.CH(CH$_3$).CH(CH$_3$).O—) was treated with a solution of sodium borohydride (2.26 g.) in water (50 ml.) added below the surface during 20 mins. Excess sodium carbonate solution was added and the product isolated with benzene. Removal of the benzene gave the crude mixed epimers of 2'-oxobutyl-12-hydroxy-2-dehydroemetine 2,3-butylene ketal (VIII; X=—O.CH(CH$_3$)CH(CH$_3$)O—) (24.2 g.).

(iii) Conversion of 2'-oxobutyl-12-hydroxy-2-dehydroemetine 2,3-butylene ketal (VIII;

X=—OCH(CH$_3$)CH(CH$_3$)O—)

into 2-dehydroemetine (XIII)

(a) Via its acetate.—The material obtained as described in (ii) (24.2 g.) was dissolved in dry benzene (180 ml.) and treated with anhydrous potassium carbonate (3.56 g.) and acetic anhydride (8 ml.). After being heated under reflux for 16 hrs. the reaction mixture was filtered. Removal of the benzene gave the epimeric acetates (XIV;

X=—O.CH(CH$_3$).—CH(CH$_3$).O—)

(24 g.) as a froth. A solution of this material (24.2 g.) in ether (180 ml.) was added to ammonia (800 ml.) and t-butanol (10.3 ml.) and a solution of lithium (0.9 g.) in ammonia (200 ml.) was added as rapidly as possible (45 sec.) from a tap funnel, the addition being stopped when the solution assumed a blue colour. After stirring for a further 3 sec. the blue colour was discharged with acetone and the solvents removed in vacuo. To the residue was added water (320 ml.) and hydrazine dihydrochloride (8.5 g.) and the pH was adjusted to 2 with N-hydrochloric acid. After being heated for 3 hrs. on the steam bath the reaction mixture was cooled and poured into 2 N-sodium carbonate (400 ml.) and the product was isolated with benzene, and dissolved in ethanol (60 ml.). 5 N ethanolic hydrogen chloride (15 ml.) was added and, after 2 days at 5°, the crystalline 2-dehydroemetine dihydrochloride (15.37 g.) was filtered off, washed with ethanol:ether (1:1 and dried at 60°/0.3 mm.

(b) Via its benzoate.—2'-oxobutyl-12-hydroxy-2-dehydroemetine 2,3-butylene ketal (2.5 g.) was dissolved in benzene (20 ml.) and pyridine (8 ml.) and benzoyl chloride (2.3 ml.) was added. After being kept at 50° for 16 hrs. the reaction mixture was poured into 2 N-sodium carbonate (80 ml.) and the product isolated with benzene. The crude benzoate was a froth. This material (3.7 g.) in ether (15 ml.) was added to ammonia (75 ml.) and chips of lithium were added until a permanent blue colour was obtained. After 15 min. the blue colour was discharged with acetone, the ammonia removed, and the product isolated with benzene to give 2'-oxobutyl-2-dehydroemetine 2,3-butylene ketal

XV; X=—O.CH(CH$_3$)CH(CH$_3$)O—)

which could be converted into 2-dehydroemetine by treatment with hydrazine dihydrochloride as in (a).

Example 21.—Conversion of diketone (VI) into its mono-(1-methyl-trimethylene) ketal (VII; X=—OCH$_2$CH$_2$CH(CH$_3$)O—)

and thence into 2-dehydroemetine (XII)

To a solution of anhydrous p-toluenesulphonic acid (17 g.) in chloroform (70 ml.) the diketone (20 g.) was added, the solution was cooled to 20° and butane-1,3,-diol (60 ml.) was added. After standing for 1½ hours the solution was poured into 2 N sodium carbonate (300 ml.) and extracted with benzene (1× 200 ml.; 2× 100 ml.). The extracts were washed with water (2× 75 ml.) and evaporated to a gum. The latter was dissolved in methanol (300 ml.) and cooled to 7°. Sodium borohydride (2.3 g.) was added and after 40 minutes stirring the methanol was evaporated. The residue was taken up in water (300 ml.) and benzene (200 ml.) and the aqueous layer was extracted twice more with benzene (2× 100 ml.). The extracts were evaporated to 200 ml. and the acetylation and the remainder of the process carried out as in Example 19(vi).

Weight of dehydroemetine dihydrochloride=14.02 g. (68.2% theory).

Example 22

(i) Conversion of diketone VI into its 1,2-propylene-ketal (VII X=—OCH$_2$CH(CH$_3$)O—)

Diketone VI (0.56 g., 1 mmole) was dissolved in dry benzene (20 ml.) and propane-1,2-diol (10 ml.) and treated with a 0.5 M solution of p-toluenesulphonic acid in benzene (6 ml.). After being shaken for 1.5 hrs. at room temperature the reaction was poured into excess sodium carbonate solution and the product isolated with benzene. Removal of the benzene gave the crude ketal as a white froth.

$\nu_{max.}^{CS_2}$ 1720<5% saturated carbonyl and 1685 cm.$^{-1}$ 90% —CO—C=C. Crystallization from ether gave a purer product, as plates, $\lambda_{Inf.}^{EtOH}$ 230 m$\mu$ ($\epsilon$ 22,000) and $\lambda_{max.}^{EtOH}$ 283 m$\mu$ ($\epsilon$ 9080)

(Found: C, 69.5; H, 7.8; N, 4.2. C$_{36}$H$_{48}$N$_2$O$_7$ requires C, 69.6; H, 7.8; N, 4.5%.)

(ii) Conversion of diketone (VI) into its mono-1,2-propylene ketal (VII; X=—OCH$_2$CH(CH$_3$)O—) and thence 2-dehydroemetine (XII)

A mixture of the diketone (20 g.), anhydrous p-toluene-sulphonic acid (17 g.) and propane-1,2-diol (60 ml.) was shaken at room temperature for 1¾ hrs. The mixture was poured into sodium acetate (17 g.) in water (300 ml.) and the procedure described in Example 19 (vi) was followed.

Weight of dehydroemetine dihydrochloride=11.13 g. (54% theory).

Examples 23.—Conversion of diketone (VI) into its mono-trimethylene ketal (VII; X=—OCH$_2$CH$_2$CH$_2$O—) and thence into 2-dehydroemetine (XII)

A mixture of the diketone (10 g.), anhydrous p-toluenesulphonic acid (8.5 g.) and propane-1,3-diol (30 ml.) was allowed to stand at room temperature for 24 hrs. The mixture was poured into sodium acetate (8.5 g.) in water (150 ml.) and the procedure described in Example 19(vi) was followed.

Weight of dehydroemetine dihydrochloride=5.28 g. (51.3%).

Example 24.—Conversion of 2'-oxobutyl-12-hydroxy-2-dehydroemetine ethylene ketal (VIII; X=—OCH$_2$CH$_2$O—) ($\beta$-epimer) into 12-hydroxy-2-dehydroemetine (XIII) ($\beta$-epimer)

2' - oxobutyl-12-hydroxy-2-dehydroemetine ethylene ketal ($\beta$-epimer; see Example 19(iia)) (0.91 g.) and hydrazine dihydrochloride (0.41 g.) in water (10 ml.) were heated on the steam bath for 2 hrs. The reaction mixture was cooled and poured into excess 2 N-sodium carbonate solution and the product was isolated with benzene. Crystallisation from benzene or ethanol gave 12-hydroxy-2-dehydroemetine ($\beta$-epimer), M.P. 190–194°; it was identified by thin-layer chromatography with the faster-running epimer produced as in Example 7;

$\lambda_{max.}^{EtOH}$ 282–285 m$\mu$ ($\epsilon$ 7,520), $\nu_{max.}^{bromoform}$ 3200 cm.$^{-1}$ (bonded —OH)

(Found: C, 73.0; H, 7.5; N, 5.0. $C_{29}H_{38}N_2O_5.C_6H_6$ requires C, 73.4; H, 7.7; N, 4.9%).

Example 25.—Conversion of diketone (VI) into its monoxime (VII; X=NOH)

The diketone (1.13 g.) and hydroxylamine hydrochloride (0.14 g.) were suspended in water (15 ml.) and adjusted to pH 4 with a few drops of acetic acid. After being kept at 5° for 16 hrs. the recation mixture was treated with exces sodium carbonate solution and the product isolated with benzene. Removal of the solvent gave a residue which was crystallised from ethyl acetate to give the monoxime as prisms;

$\lambda_{max.}^{EtOH}$ 282–283 m$\mu$ ($\epsilon$ 10,000), $\nu_{max.}^{bromoform}$ 3570 (—OH) and 1680 cm.$^{-1}$ (C=C—CO—)

Example 26.—Conversion of the diketone (VI) into 2'-oxobutyl-12 - hydroxy-2-dehydroemetine methoxime (VIII; X=—NOCH$_3$)

The diketone (22.5 g.) and methoxyamine hydrochloride (3.54 g.) were suspended in water (185 ml.) at 5–10° and acetic acid (6 ml.) was added. After being kept for 2.5 hrs. at 10°, the resulting solution of the mono-methoxime (VII; X=—NOCH$_3$) was treated with a solution of sodium borohydride (2.26 g.) in water (50 ml.), added below the surface. The reaction mixture was basified with 2 N-sodium carbonate (140 ml.) and the product isolated with benzene. Removal of the benzene gave the epimeric alcohols as a froth.

Example 27

(i) Conversion of 3-acetyl-1,2,3,4,6,7-hexahydro-2-hydroxy - 9,10-dimethoxy-2-[1',2',3',4'-tetrahydro-6',7'-dimethoxy - 2'-(3"-oxobutyl)-isoquinol-1'-yl]methyl-11b[H]-benzo[a]-quinolizine (XVII; X=O) into its mono-ethylene ketal (XVII; X=—OCH$_2$CH$_2$O—) and mono-2,3 butyleneketal (XVII; X=—OCH(CH$_3$)CH(CH$_3$)O—)

(a) The diketone (2.32 g.) was dissolved in benzene (40 ml.) and ethylene glycol (5.1 ml.) and a 0.5 M-solution of p-toluenesulphonic acid in benzene (24 ml.) were added. After being shaken for 0.5 hr. at 21° the reaction mixture was poured into excess sodium carbonate solution and the product was isolated with benzene. Crystallisation from methanol gave the mono-ethylene ketal as plates, $\lambda_{max.}^{EtOH}$ 281–283 m$\mu$ ($\epsilon$ 7,900)

(Found: C, 67.6; H, 8.1; N, 4.5. $C_{35}H_{48}N_2O_8$ requires C, 67.3; H, 7.7; N, 4.5%.)

(b) p-Toluenesulphonic acid monohydrate (13.6 g., 71 mmole) was heated at 100°/0.5 mm./1 hr. The resultant liquid anhydrous acid was cooled and butane-2,3-diol (43 ml.) added. The solution was cooled to room temperature and treated with diketone free base (14.5 g., 25 mmole). After being shaken at 29° for 1.75 hrs. the reaction product was poured into stirred sodium carbonate and the product isolated by extraction with benzene (×3). After washing the combined extracts with water (×3) and drying on potassium carbonate, removal of the solvent gave an off white froth (14.3 g.). The above froth (6 g.) crystallised from ether (15 ml.) to give the monoketal (5.02 g., 84%) as needles. (Found: C, 67.8; H, 8.0; N, 4.4. $C_{37}H_{52}N_2O_8$ requires C, 68.1; H, 8.0; N. 4.3%.) The above material was also crystallised from isopropanol.

(ii) Dehydration of mono-ethylene ketal (XVII; X=—OCH$_2$CH$_2$O—)
to give (XII; X=OCH$_2$CH$_2$O—)

The ketal (0.312 g.) in pyridine (2 ml.) was treated with methanesulphonyl chloride (0.1 ml.) at 22° for 20 hrs. The reaction mixture was treated with excess sodium carbonate solution and the product was isolated with benzene and crystallised from ether containing a trace of ethyl acetate. The product (0.202 g.) was identical with that obtained from Example 19(i).

Example 28.—Conversion of diketone (VI) into its mono-cyanohydrin

The diketone (1.12 g.) and potassium cyanide (0.65 g.) in ethanol (20 ml.) were treated with acetic acid (3 ml.). After being kept for 16 hrs. at 20°, the mixture was filtered to remove inorganic material, and the filtrate was concentrated in vacuo and poured into water. The solution was adjusted to pH 8 with sodium carbonate and the product isolated with benzene. Removal of the benzene gave a pale yellow froth (1.13 g.); this was dissolved in a little ethyl acetate and the solution treated with ether, when a crystalline solid separated. Its infrared spectrum showed the presence of conjugated ketone and of bonded hydroxyl; unconjugated carbonyl was virtually absent.

Example 29.—Conversion of 2'-oxobutyl-12-acetoxy-2-dehydroemetine 2,3-butylene ketal (XIV; X=—OCH(CH$_3$).O—)

into 2-dehydroemetine (XII)

The epimeric acetates (XIV; X=—OCH(CH$_3$).CH(CH$_3$).O—)

prepared as described in Example 20 from 19.8 g. of the diketone (VI), were dissolved in ether (180 ml.), and the solution was added to liquid ammonia (800 ml.). A solution of calcium (2.7 g.) in ammonia (200 ml.) was added as rapidly as possible from a tap funnel until a permanent blue colour was achieved. The blue colour was immediately discharged by addition of acetone and the solvents were removed in vacuo. The residue was treated as in Example 20(iia) and the crystalline product (11.65 g.) was isolated. Paper chromatographic analysis showed it to be substantially 2-dehydroemetine dihydrochloride.

Example 30.—Conversion of the diketone (VI) into its monoxime (VII; X=:N.OH)

The diketone (VI) (113 g., 0.2 mole) was suspended in water (1.5 l.) and acetic acid (25 ml.) was added. The resultant solution was cooled to 5° and treated with a solution of hydroxylamine hydrochloride (14.9 g., 0.216 mole) in water (30 ml.) and acetic acid (12 ml.). After being kept at 0° for 21 hrs. the reaction mixture was partitioned between 2 N sodium carbonate solution (1.5 l.) and benzene (800 ml.) and the aqueous phase was extracted wtih more benzene (2×300 ml.). After drying over sodium sulphate removal of the benzene gave a solid (115.5 g.). The above solid was treated with boiling ethyl acetate (250 ml.) from which it rapidly crystallised, giving the monoxime as a crystalline solid (108.5 g., 93.5%).

$\lambda_{max.}^{EtOH}$ 282–283 m$\mu$. ($\epsilon$ 10,000).

Thin-layer chromatography showed the presence of two components, presumably the syn- and anti-oximes.

(Found: C, 69.1; H, 7.7; N, 7.7. $C_{33}H_{43}N_3O_6$ requires C, 68.6; H, 7.5; N, 7.3%).

Example 31.—Reduction of the monoxime (VII; X=:N.OH)

to 2′-oxobutyl-12-hydroxy - 2 - dehydroemetine oxime (VIII; X=:N.OH)

The monoxime (VII; X=:N.OH) (4.18 g., 7.25 mmole) was dissolved in a mixture of benzene (40 ml.), ethanol (20 ml.) and water (2.5 ml.) and treated with a solution of sodium borohydride (0.38 g.) in water (1.5 ml.). After being kept 2.5 hrs. at room temperature the reaction mixture was distributed between 2 N sodium carbonate solution and benzene. After drying over sodium sulphate removal of the benzene gave the mixed epimeric alcohols as a froth (4.2 g.).

Example 32.—Conversion of 2′-oxobutyl-12-hydroxy-2-dehydroemetine oxime (VIII: X=:N.OH) into 2′-oxobutyl-12-hydroxy-2-dehydroemetine (IX)

The mixture of epimeric alcohols (53.8 g.), prepared as in the previous example, was dissolved in a mixture of 2 N hydrochloric acid (500 ml.) and acetone (100 ml.). After being kept for 0.5 hr. at room temperature the reaction mixture was poured into 2 N sodium carbonate solution (2 l.) and the product was isolated with benzene. After washing with water and drying over sodium sulphate removal of the benzene gave the mixed epimers (48 g.) of the 12-hydroxy-compound (IX). Crystallisation from ethyl acetate and then from methanol gave the α-epimer of 2′-oxobutyl-12-hydroxy - 2 - dehydroemetine M.P. 160–162.5°. (Found: C, 70.5; H, 7.9; N, 5.1. $C_{33}H_{44}N_2O_6$ requires C, 70.2; H, 7.8; N, 5.0%.) It was shown by infrared, N.M.R. and thin layer chromatographic data to be a single isomer, and identical with that obtained in Example 3.

On treating the ethyl acetate mother liquors with ether (300 ml.) the β-epimer of 2′-oxobutyl-12-hydroxy-2-dehydroemetine (11.8 g.) was obtained. Crystallisation from ethanol gave material with M.P. 154–157°. (Found: C, 70.0; H, 7.7; N, 4.9. $C_{33}H_{44}N_2O_6$ requires C, 70.2; H, 7.8; N, 5.0%.)

On thin layer chromatography on alumina with 5% methanol in ethyl acetate the α- and β-isomers showed $R_F$ values of 0.5 and 0.75 respectively.

Example 33.—Conversion of 2′-oxobutyl-12-hydroxy-2-dehydroemetine (IX) into the ethylene ketal (VIII: X=—OCH₂CH₂O—)

The mixed epimers of 2′-oxobutyl-12-hydroxy-2-dehydroemetine (IX) (2.6 g.) were dissolved in ethylene glycol (30 ml.) and anhydrous p-toluenesulphonic acid (2.8 g.) added. After being kept at room temperature for 3.75 hrs. the solution was added to a vigorously stirred mixture of 2 N sodium carbonate (150 ml.) and benzene (100 ml.). Removal of the benzene gave the mixed epimers (VIII; X=—OCH₂CH₂O—) as a froth (2.55 g.), identical with the material obtained in Example 19(iia).

Example 34.—2′-oxobutyl-12-hydroxy-2 - dehydroemetine ethylene ketal (VIII: X=—OCH₂CH₂O—) (α-epimer)

Into a 1 l. flask fitted with a stirrer and water separator was placed 2′-oxobutyl-12-hydroxy-2-dehydroemetine (α-epimer) (24 g.), ethylene glycol (300 ml.), petroleum ether 40–60° (150 ml.) and anhydrous p-toluenesulphonic acid (26 g.). After heating under reflux for 6.5 hrs. the reaction mixture was poured into 0.5 N sodium carbonate (3 l.) and the product was isolated with benzene. Crystallisation from ethyl acetate gave 2-oxobutyl-12-hydroxy-2- dehydrometine ethylene ketal (12.5 g.) identical with the α-epimer obtained in Example 19(iia).

Example 35.—Conversion of the diketone (VI) into 2′-oxobutyl-12-hydroxy - 2 - dehydroemetine methoxime (VIII; X=:NOCH₃)

The diketone (22.5 g.) and methoxyamine hydrochloride (3.54 g.) were suspended in water (185 ml.) at 5–10° and acetic acid (6 ml.) was added. After being kept for 2.5 hrs. at 10° the resulting solution of the monomethoxime (VII: X=:NOCH₃) was treated with a solution of sodium borohydride (2.26 g.) in water (50 ml.), added below the surface. The reaction mixture was basified with 2 N sodium carbonate (140 ml.) and the product isolated with benzene. Removal of the benzene gave the epimeric alcohols as a froth.

Several crystallisations from ethyl acetate gave the β-isomer of 2′-oxobutyl-12-hydroxy - 2 - dehydroemetine methoxime as prisms, $R_F$ 0.61 (alumina: 2% methanol in ethyl acetate).

$\mu_{max.}^{bromoform}$ 3200 cm.⁻¹ (bonded —OH)

(Found: C, 69.0; H, 8.1; N, 7.2. $C_{34}H_{47}N_3O_6$ requires C, 68.8; H, 8.0; N, 7.1%). On being left for several weeks the ethyl acetate mother liquors deposited the α-epimer as large prisms, $R_F$ 0.4.

$\mu_{max.}^{bromoform}$ 3620 cm.⁻¹ (—OH)

(Found: C, 68.9; H, 8.0; N, 6.9. $C_{34}H_{47}N_3O_6$ requires C, 68.8; H, 8.0; N, 7.1%).

Example 36.—Conversion of 2′-oxobutyl-12-hydroxy-2-dehydroemetine methoxime (VIII; X=:NOCH₃) into the corresponding acetate (XIV; X=:NOCH₃)

The mixture of epimeric alcohols (0.5 g.), prepared as in the previous example, was dissolved in a mixture of benzene (7.0 ml.), pyridine (2 ml.) and acetic anhydride (0.75 ml.). After being kept for 16 hrs. at 50° the reaction mixture was poured into excess sodium carbonate solution and the product was isolated with benzene. Removal of the benzene gave the epimeric acetates (XIV; X=:NOCH₃) as a froth (0.52 g.). $R_F$ 0.70 (2% methanol in ethyl acetate).

$\mu_{max.}^{bromoform}$ 1723 and 1255 cm.⁻¹ (—OAc)

Example 37.—Conversion of 2′-ketobutyl-12-hydroxy-2-dehydroemetine methoxime (VIII) into 12-hydroxy-2-dehydroemetine (XIII)

2′ - ketobutyl-12-hydroxy-2-dehydroemetine methoxime (59 mg.) and hydrazine dihydrochloride (32 mg.) were heated at 100° in water (0.5 ml.). After a period of 2.5 hrs. the reaction mixture was basified and the product isolated with benzene. Removal of the benzene gave 12-hydroxy-2-dehydroemetine (35 mg.) which was shown to be identical with an authentic specimen by infrared spectroscopy.

We claim:

1. A process for the preparation of compounds of the general formula

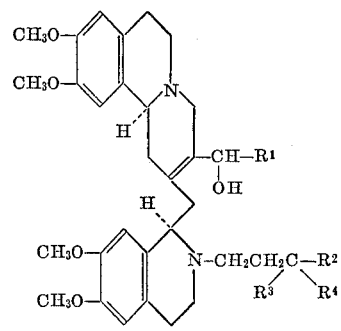

wherein R[1] and R[2] are each lower alkyl groups having 1 to 5 carbon atoms and R[3] and R[4] together are selected from the group consisting of a cyclic ketal protecting group having 2–6 carbon atoms, an unsubstituted hydrazone group, a phenyl hydrazone group, an acyl hydrazone group, a sulphonyl hydrazone group, a semicarbazone group, an oxime group, an alkoxime group and a noncyclic ketal group having 1–6 carbon atoms which comprises reacting a compound of the general formula

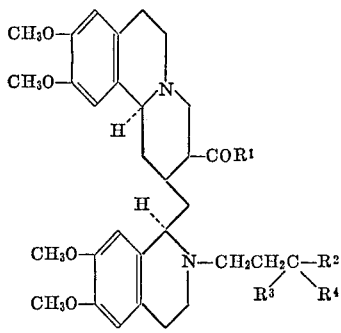

wherein R[1], R[2], R[3] and R[4] have the above meanings with a compound selected from the group consisting of complex borohydride reducing agent and an aluminium hydride reducing agent.

2. A process according to claim 1 wherein the protected ketone starting material is prepared by reacting a compound of the general formula

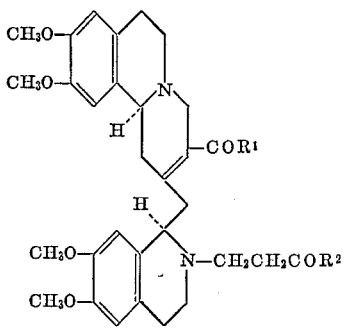

wherein R[1] and R[2] have the meanings given in claim 1 with a ketone-protecting agent selected from the group consisting of glycols having 2–6 carbon atoms, hydrazine, phenyl hydrazines, acylhydrazines, sulphonylhydrazines, semicarbazides, hydroxylamine, alkoxyamines and alkanols having 1–6 carbon atoms.

3. A process according to claim 1 wherein a compound of the general formula

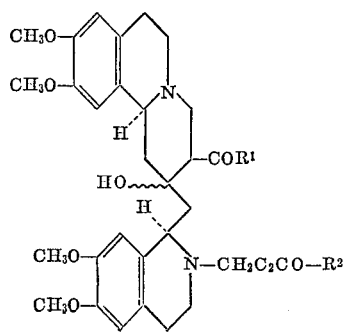

wherein R[1], R[2], R[3] and R[4] have the meanings given in claim 1 is reacted with a ketone protecting agent to form a compound of the formula

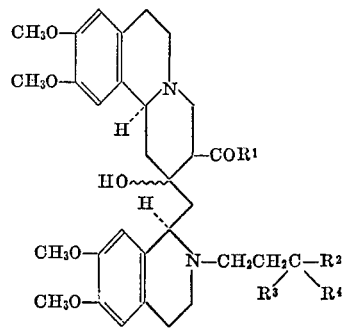

wherein R[1], R[2], R[3] and R[4] have the meanings given in claim 1 and said compound formed is further reacted with a dehydrating agent selected from the group consisting of a base and an acid halide to form a 2,3-double bond.

4. A process for the production of compounds of the formula

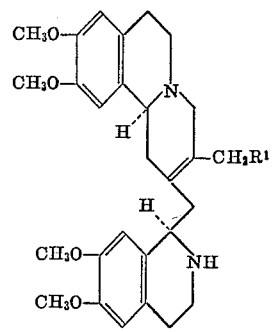

wherein R[1] is lower alkyl of from 1 to 5 carbon atoms, which comprises (a) reacting the compound obtained according to claim 1 with an acylating derivative of a carboxylic acid to form a 3-acyloxyalkyl group, (b) reducing the compound obtained to convert the 3-acyloxyalkyl group to a 3-alkyl group, (c) treating to remove the ketone-protecting group from the compound, and (d) treating to remove the 2'-position side chain.

5. A process according to claim 4 wherein the reduction of the 3-acyloxyalkyl group is effected with a reducing agent selected from the group consisting of a metal-ammonia and a metal-liquid amine reducing agent, the metal being selected from the group consisting of an alkali metal and an alkaline earth metal.

6. A process according to claim 4 wherein the 2'-side chain is removed by treatment with hydrazine.

7. A process according to claim 4 wherein stages (c) and (d) are effected simultaneously by reaction with hydrazine at a strongly acid pH.

8. A process according to claim 4 wherein the ketone-protecting group is a semicarbazide group and the 2'-side chain is removed by treatment with hydrazine at a pH of 4.0 or below.

9. A process according to claim 4 wherein the ketone-protecting group is a cyclic ketal group and the 2'-side chain is removed by treatment with hydrazine at a pH of 1.0 or below.

10. A process according to claim 4 wherein the cyclic ketal group is derived from a compound selected from the group consisting of ethylene glycol, butane-2,3-diol, butane-1,3-diol or propane-1,2-diol.

11. A compound selected from the group consisting of a compound of the formula

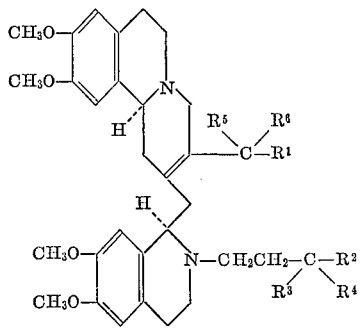

and an acid addition salt thereof wherein $R^1$ and $R^2$ are each lower alkyl groups having from 1 to 5 carbon atoms and $R^3$ and $R^4$ together are selected from the group consisting of a cyclic ketal protecting group having 2–6 carbon atoms, an unsubstituted hydrazone group, a phenyl hydrazone group, an acyl hydrazone group, a sulphonyl hydrazone group, a semicarbazone group, an oxime group, an alkoxime group and a noncyclic ketal group having 1–6 carbon atoms; $R^5$ is hydrogen and $R^6$ is selected from the group consisting of hydrogen, a hydroxyl group and an acyloxy group or $R^5$ and $R^6$ together form a ketonic oxygen atom.

12. A compound according to claim 11 wherein $R^3$ and $R^4$ together are a cyclic ketal protecting-group having from 2 to 6 carbon atoms.

References Cited
UNITED STATES PATENTS

| | | | |
|---|---|---|---|
| 3,121,720 | 2/1964 | Barton et al. | 260—288 |
| 3,311,633 | 3/1967 | Brossi | 260—288 |
| 3,359,264 | 12/1967 | Gerecke | 260—240 |

OTHER REFERENCES
Brossi, Helv. Chem. Acta, vol. XLII, p. 779 (1959).

DONALD G. DAUS, Primary Examiner

U.S. Cl. X.R.

260—247, 288, 505, 543, 544, 554, 566, 569, 609, 635, 687